United States Patent [19]
Kazemzadeh

[11] Patent Number: 5,914,148
[45] Date of Patent: Jun. 22, 1999

[54] METHOD AND APPARATUS FOR PRODUCING A DOUGH PRODUCT

[75] Inventor: Massoud Kazemzadeh, Bloomington, Minn.

[73] Assignee: Buhler, Inc., Minneapolis, Minn.

[21] Appl. No.: 08/995,203

[22] Filed: Dec. 19, 1997

[51] Int. Cl.$^6$ .................................. A23L 1/00; A23P 1/00
[52] U.S. Cl. ...................... 426/516; 425/198; 425/376.1; 425/378.1; 426/523
[58] Field of Search ...................................... 426/516, 518, 426/523; 425/197, 198, 378.1, 376.1; 264/211.12

[56] References Cited

U.S. PATENT DOCUMENTS

| | | | |
|---|---|---|---|
| 2,802,237 | 8/1957 | Davis | 425/378.1 |
| 3,329,102 | 7/1967 | Urschel | 426/496 |
| 3,942,767 | 3/1976 | Hanzawa et al. | 366/142 |
| 4,055,681 | 10/1977 | Balaz et al. | 426/656 |
| 4,542,686 | 9/1985 | Bansal | 425/376.1 |
| 4,790,996 | 12/1988 | Roush et al. | 426/516 |
| 5,558,886 | 9/1996 | Martinez-Bustos et al. | 425/378.1 |
| 5,639,159 | 6/1997 | Sato | 425/378.1 |
| 5,641,529 | 6/1997 | Kunas | 426/516 |

FOREIGN PATENT DOCUMENTS

| | | |
|---|---|---|
| 149 571 | 3/1903 | Germany . |
| 1 257 419 | 12/1967 | Germany . |
| 235 236 A1 | 4/1986 | Germany . |
| 779075 | 11/1980 | Russian Federation . |
| 2 061 173 | 8/1983 | United Kingdom . |

OTHER PUBLICATIONS

*Food Process Design and Evaluation,* "Extruded Cereals and Snacks" by Massoud Kazemzadehl, Department of Food Science and Department of Agricultural Engineering Smith Hall, Purdue University, West Lafayette, Indiana, pp. 194–233 and 235–251.

*Primary Examiner*—George Yeung
*Attorney, Agent, or Firm*—Burns, Doane, Swecker & Mathis, LLP

[57] ABSTRACT

A method for producing a dough product from starch containing ingredients of cellular structure, to obtain a product containing at least 50 percent starch material. This method comprises extruding the ingredients by passing them through an extruder of a predetermined inner barrel diameter. Within this barrel, an extruder rotor of predetermined outer diameter is accommodated to exert a mixing, kneading and heating effect onto the ingredients and to form a substantially homogeneous mass. This mass is then discharged and distributed from the extruder under predetermined pressure into a straight heated tube of an inner cross-section larger than the outer diameter of the screw(s). In this way, a plug flow of the mass through the heated tube is established to cook the mass at a predetermined temperature and for a predetermined period. Finally, the mass is formed at the end of the tube into a desired shape, but maintains mostly its cellular structure at least in part.

28 Claims, 2 Drawing Sheets

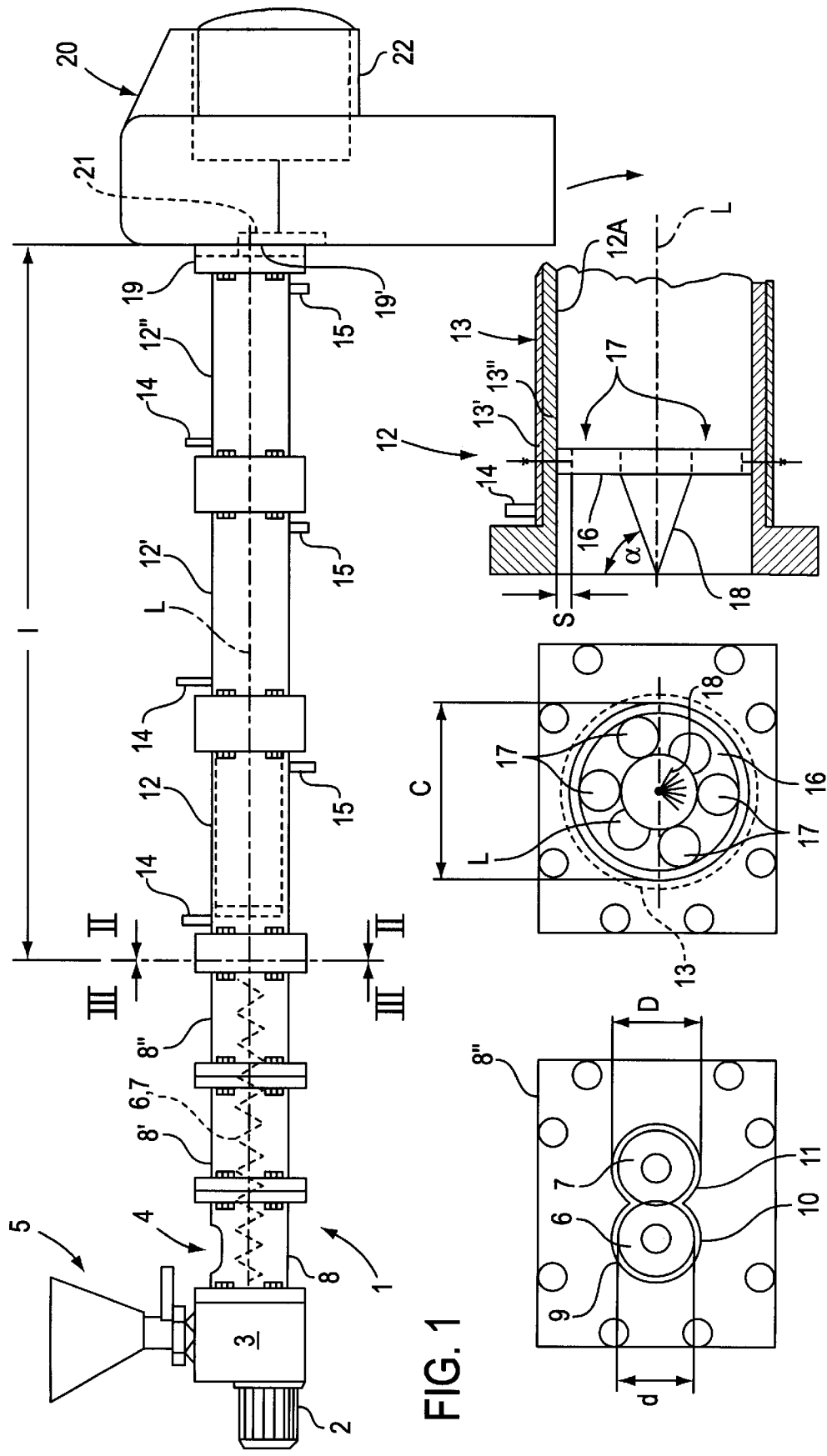

METHOD AND APPARATUS FOR PRODUCING A DOUGH PRODUCT

BACKGROUND OF THE INVENTION

1. Field of the Invention

This invention relates to a method and an apparatus for producing a dough product from starch containing ingredients of cellular structure to obtain a product, preferably containing at least 50 percent starch material. The starch containing raw material exhibits a cellular structure, and in many cases, but not in all, the end product can show a cellular structure too; the invention is, however not restricted to such an end product.

2. State of the Art

U.S. Pat. No. 4,055,681 discloses a method for producing an expanded dry pet food from starch containing material. Downstream an extruder, there is a bent tube-like hollow attachment which has a jacket to be heated by steam to cool a dough-like product at 200° F. to 300° F. The bending(s) of the tube, however, prevent a uniform flow of the material so that it cannot be shaped in a single procedure. In addition, a belt is necessary to spread the relatively liquid dough over its surface, after which the flat dough is cut into strips or plates to be cut into granules in an additional step.

U.S. Pat. No. 4,790,996 discloses an extrusion tube cooker which comprises a straight tube attached to the end of an extruder, such as a twin-screw extruder. A die at the end of the tube has a plurality of shaping openings, the cross-section of which is, obviously, smaller than the inner cross-section of the tube. The problem with such an extrusion tube cooker is how to fill the whole inner cross-section of the tube. While the final product is withdrawn from the die's openings by means of rollers or the like, a non-uniformly filled tube produces a completely gelatinized product of poor uniformity. Here also, additional means are necessary to accomplish final shaping, for example a comminution mill, grating rolls, briquetting means, pelletizers or the like. Moreover, the gelatinized product, when used as a snack food, cannot maintain its "body" as soon is contacts liquids, such as milk; being of a poor "bowl life" (cf. "Extruded Cereals and Snacks", Massoud Kazemzadeh, Buhler Inc., Minneapolis, 1993) it becomes an undefined squash which gives a less than agreeable feeling in the mouth.

SUMMARY OF THE INVENTION

It is an object of the present invention to provide a method and an apparatus which produce a cooked product of better uniformity and texture.

According to exemplary embodiments of the invention, this object is achieved by ensuring a plug flow over the whole length of the hollow attachment or tube.

It should be noted that, in exemplary processes of the invention, the extruder is used as a mixing chamber, whereas the hollow attachment or tube is a pressure cooker for a continuous plug flowing mass, thus generating minimum shear. It should be noted that shear energy results, of course, in two kinds of heat energy. One is the heat energy generated by mechanical energy caused by the back flow and dispersive elements as well as by the rotation of the screw (or screws) within the barrel. This results in a shear rate which is destructive to the molecular structure of biopolymers. The second type of heat energy is generated by shear stress which is directly proportional to the pressure developed within the barrel or die. This kind of energy is not destructive and is rather desirable, because an increase in pressure results in a rapid and complete diffusion of a plastisizer, such as water, onto the food particles, thus causing the biopolymer to go through the glass transition, thereby becoming more "relaxed" and less damageable.

The term plug flow is very common to those skilled in the art and means that the material flows uniformly through the tube-like plug. Thereby, the biopolymer molecule as well as the extruders mass are not sheared or mechanically damaged during this extrusion process. While it has been established that a plug flow is necessary to achieve the above object, it has been found that the prior art did not and could not provide such a plug flow for two reasons. The first is that feeding extruded material into a heated tube fills first the bottom regions of it, before higher levels inside the tube can be filled, instead of creating a constant and uniform plug flow through the overall cross-section of the tube.

This causes, as a second reason, the bottom material to have a longer residence time within the tube according to the process of the prior art, thus tending to caking. In this way, the initially smooth inner surface of the tube becomes more and more narrowed and irregular so that a desirable plug flow is prevented even to a greater extent. On the other hand, the prolonged residence time of part of the material causes not only gelatinization, but to a certain extent also a denaturation which leads to the above mentioned poor quality. In contrast, according to exemplary embodiments of the present invention, the relative high pressure and, thus, the ready infiltration of water into the biopolymers molecule decreases the gelatinization temperature to 85° C. in maximum or even less.

It has been found that a plug flow can only be ensured by distributing the material over the whole cross-section of the tube from the very start on. In this way, uniform conditions are created for cooling the dough under pressure as long as a straight tube is used. As will be shown later, a product according to exemplary embodiments of the invention has a visible surface structure and maintains its "body" even in contact with liquids. Surprisingly, due to this inner cohesiveness or "body", the shaping die or opening can directly form the product intended, optionally using a granulator knife, without additional shaping devices.

While it would, in principle, be possible to use a single screw extruder, it has been found that such an extruder allows too much slippage between the rotor and the extruder barrel so that the material is subjected to a kind of pumping action, being conveyed more intermittently rather than uniformly and continuously. However, because such a uniform and continuous conveyance enhances the creation of a plug flow very much, an extruder with more than one screw can be used, such as a twin-screw extruder. Due to intermeshing threads, not only kneading action is intensified, but the dough is conveyed more uniformly. This applies particularly if the screws perform a counter-rotating movement. In contrast, as soon as the dough enters the tube where no screw or other tool is provided, any denaturation of the farinaceous or starch material is avoided so that the material keeps its cellular structure.

BRIEF DESCRIPTION OF THE DRAWINGS

Further details of the invention will become apparent from the following description of preferred embodiments schematically illustrated in the drawings in which:

FIG. 1 shows a side elevation of an exemplary apparatus according to the invention carrying out an exemplary inventive method;

FIG. 2 is a front view of the discharge end of the extruder barrel shown in FIG. 1 when seen in the direction of arrows II—II of FIG. 1;

FIG. 3 is a front view along the line III—III of the first or entrance end of a hollow tube shown in FIG. 1 and attached to the discharge end of the extruder barrel, and a front view of a distributing plate or web situated therein; and FIG. 4 is a cross-sectional view of the first or entrance end of the hollow tube illustrating a side elevation of the distributing plate or web;

DETAILED DESCRIPTION OF THE PREFERRED EMBODIMENTS

Figure 5:
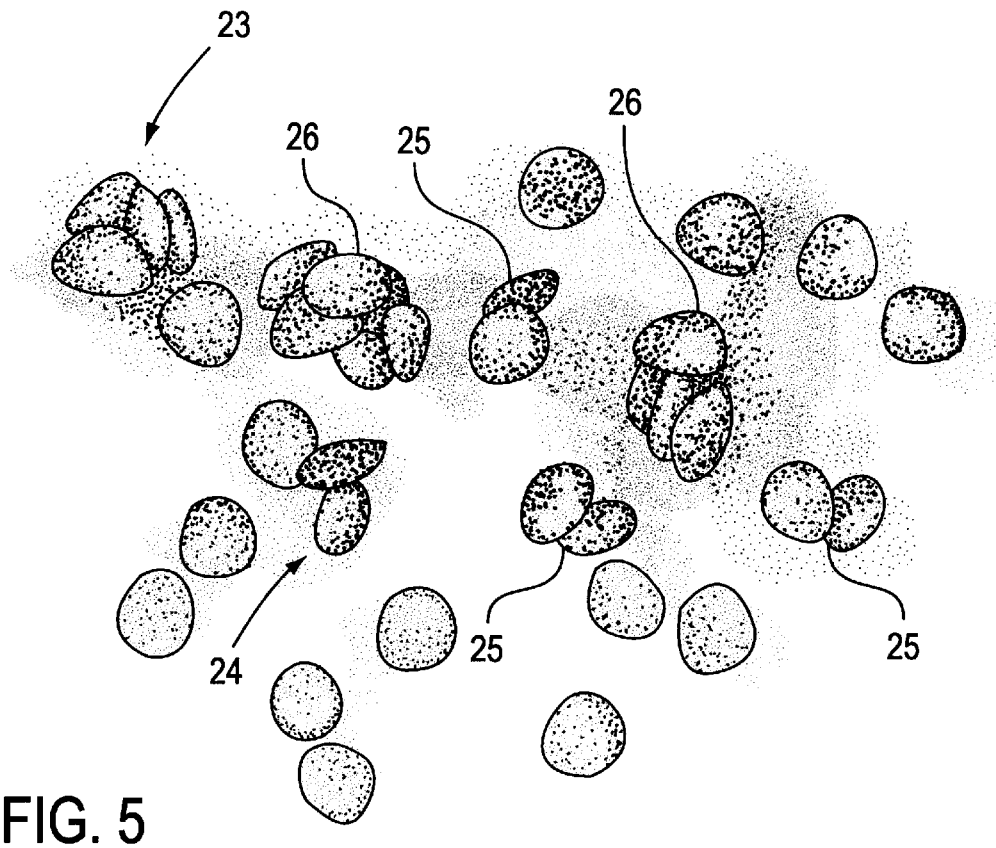
FIG. 5 shows a top view of a product produced according to the prior art.

A twin-screw extruder 1 of FIGS. 1 and 2 comprises a driving motor 2 and a gear box 3. Starch containing ingredients of cellular structure are supplied by a metering device 5 of known construction into a charging opening 4 of an extruder barrel formed by a plurality of barrel modules 8, 8' and 8". These ingredients, which contain, for example, at least 50% starch by weight, are subjected to a mixing, kneading and heating action by intermeshing screws 6, 7 as is known in making dough-like food products. Although only three modules 8, 8', 8" are shown, any number of modules and any length of the extruder barrel can be used as desired. Suitably the drive 2 and 3 is adapted to impart a counter-rotating movement to the screws 6 and 7. This is the best way to avoid a more or less intermittent or pumping conveyance of the dough-like product discharged at the end of the extruder 1.

At the end of the extruder 1, its barrel forms a discharging opening 9 which can be of any form desired, but as shown in the present embodiment, includes two communicating compartments 10, 11 to receive the respective screw 6 or 7. Each screw 6 and 7 has a predetermined outer diameter "d" surrounded by a predetermined and larger inner diameter "D" of the barrel compartment 10 or 11. As can be seen from FIG. 1, the length of the screws 6, 7 extends over the barrel modules 8, 8', 8". If necessary these modules 8, 8', 8" or part of them can comprise a heating jacket or other heating means to perform a preliminary cooking action. Moreover, the screws or rotors 6, 7 of the extruder 1 can contain not only screw threads, but also kneading and/or shearing tools of known design, if desired.

When the mixed and kneaded mass of the extruded product leaves the discharging opening 9, it enters an entrance end of a tube 12, 12', 12" extending along a longitudinal axis "L". When comparing FIGS. 2 and 3, it will be seen that the discharging opening 9 has an inner cross-section "c" which is free from any screw to avoid too intense a mechanical treatment of the product, and which is larger than the outer diameter d of the screws 6, 7. Its outer circumference, shown in dotted lines in FIG. 3, is formed by a heating jacket 13 having inlet pipes 14 and outlet pipes 15 for a heating medium such as steam. Alternately, any heating device desired can be used, such as electrical heating wires wound around the tube 12, 12', 12" or part of it, or a heating arrangement where open flames surround the tube or where other radiant heating energy is directed to the tube.

Because the inner cross-section "c" of the tube 12, 12', 12" is much larger than the outer diameter "d" of the screws (which, together with the inner diameters "D" of the barrel, determine the free cross section of the extruder through which the dough-like mass is extruded), mere feeding of the mass into the tube module 12 would lead to depositing the material on the ground or bottom portion of the tube 12, while successive portions of the mass would form overlaying layers. As a result, the dwelling time of the different portions would not be uniform, and baiting or caking of the material with a longer period of dwell would occur, as it was the case with the prior art. Accordingly, the ratio of the cross-section "c" and the diameter "d" can be on the order of 2:1, or any other suitable ratio including ratios in the range of 4:1 to 20:1 or greater. In order to achieve a uniform heat treatment, a screw can be used, but has the disadvantage of stressing the material too much.

In accordance with the present invention, it has been found that establishing an undisturbed plug flow of the material through the tube modules 12, 12', 12" would avoid the above-mentioned difficulties. Such a plug flow involves, however, several pre-conditions:

the material has to be forcibly led into the tube 12, 12', 12"; when entering the tube, it has to be distributed as uniformly as possible over the cross-section of the tube; and it has to be compressed within the tube which is done by the above-mentioned forced feeding, on the one hand, and by having the shaping die of restricted cross-section directly attached to the outlet end of the tube 12, 12', 12".

The latter pre-condition, i.e. compressing, cannot be done by increasing friction of the material within the tube, e.g. by providing a rough inner surface of the tube 12, 12', 12" or even projection and/or depressions therein, because it would affect the uniformity of the plug flow. Therefore, it can be seen that all three pre-conditions act together in a synergistic manner.

As mentioned above, the first pre-condition, i.e. forcibly feeding the material is done by the screw(s) 6, 7 of the extruder 1. If a twin screw extruder is used, as in the embodiment shown, it is able to mix flour and water as well as other ingredients to a high moisture dough, while concurrently heating the product using either conductive heat (through heat exchange), convective heat (if steam is injected into the barrel) and/or convertive energy (i.e. mechanical energy due to rotation of the screw). These characteristics of a twin screw extruder, especially of one with intermeshing screws, add to others, such as the capability of pumping products of a vast spectrum of compositions and moisture contents continuously and with high capacity. This mixing, heating and pumping action can be followed by a low (or no) shear holding chamber which holds the extruded product under high pressure at a relatively low temperature for a relatively long period of time, as will be explained below. This period of time, which is usually about only 30 secs., can be increased, according to the invention, up to 400-fold, i.e. up to 20 minutes or greater. This provides an extended cooling time and provides for extrusion of products at lower moisture content so that drying time and energy can be economized. In addition, some products profit from a special favorable flavor which develops only after a long cooking time which cannot be reproduced with a normal extruder. At the same time, the high pressure in the tube 12, 12', 12" allows a lower cooking temperature and lower heat energy.

In order to meet the second pre-condition, means can be provided at the entrance end of the tube 12, 12', 12" which distribute the mass over the tube's cross-section. Such means can be provided in various forms, e.g. by attaching a bundle of short pipes, the orifices of which are distributed over the cross-section of the tube 12, 12', 12" to the discharge end of the extruder barrel modules. However, it has been found easier and more effective, if distribution is done by a web 16 arranged substantially perpendicularly to the longitudinal axis "L" and comprising a plurality of through holes 17 distributed over the cross-section of the tube 12, 12', 12". In the embodiment shown in FIGS. 3 and 4, this web is in the form of a plate, but it will be easily recognized by those skilled in the art that any screen or mesh can be used instead. The plate, as shown, can withstand the relatively high compression forces. It can also be seen that the holes 17 are preferably in a distance "s" from the inner circumference 12a of the tube 12.

These compression forces reach on the order of at least 500 psi in an exemplary embodiment, but can be lower or higher (e.g., attaining at least 750 psi or greater). In most applications, the pressure can be around about 1000 psi, but can reach up to 2000 psi or greater. Therefore, it is useful to have an extruder 1 having a very small diameter barrel which pumps into a relatively large area of the tube 12, 12', 12", thus dispersing the pressure built up in the extruder 1 to a minimum due to the hydraulic action of such a pumping process. Such barrels of small diameter are very common and, in comparison with large diameter barrels, can easily withstand high pressures. The ratio of the inner diameter of the extruder barrel to that of the tube can be, for example, 1:2 in maximum, but will usually attain a value of about 1:4 to 1:20, or any other desired ratio which achieves the foregoing advantages.

In order to reduce the pressure which acts onto the portions of the plate 16 between the holes 17, and to achieve a smoother guidance of the material towards the holes 17, it is useful to provide guide surfaces 18 (FIGS. 3 and 4) which extend about in the direction of the longitudinal axis L and away from a shaping die 19 having at least one shaping opening 19' (FIG. 1) and being of known construction. It can be clearly seen that the opening 19' is much smaller than the inner cross-section of the tube module 12'. Since all this is known, the die 19 is only schematically indicated in dotted lines. This die 19 is provided at the end of the last tube module 13' (FIG. 4) for guiding said dough product towards at least part of the openings 17. It should be noted that the shaping arrangement comprises not only the die 19, but also a granulator 20 (FIG. 1) which includes at least one rotating knife blade 21 driven by a motor 22. Such granulators are quite common and, therefore, need not to be explained in detail.

As is best seen from FIG. 4, the guide surfaces 18 can be formed by a conical projection facing the discharge opening 9 of the extruder barrel module 8". Thus, the cone (which can be replaced by a pyramid-like projection or individual guide surfaces or any other suitable guide) forms a series of surfaces which are inclined with respect to the longitudinal axis "L" by an angle $\alpha$ (or its complementary angle). With respect to a plane normal to this axis "L", the angle $\alpha$ can be at least on the order of 45°, but can be lower, or can be higher so as to provide the least possible resistance to the flow of the dough-like mass and to leave it almost undisturbed as much as possible so that no mixing action takes place. For example, the angle $\alpha$ can be at least 60°, and in practice it has been found that an angle $\alpha$ of 65° can be used. The larger this angle $\alpha$ is, the longer and thinner the projection 18 has to be which protrudes into the mass under compression. Therefore, this angle $\alpha$ is a compromise between the requirements of a smooth guidance of the material providing little resistance only, and the requirements of the necessary strength. Those skilled in the art will recognize that a number of alternate arrangements of such guide surfaces are possible, e.g. by providing each of the openings 17 with a kind of funnel. In general, it will be a web in a circular or other shape which imposes the least shear effect onto the extrudate.

As can be seen from FIG. 4, the heating jacket 13 forms a hollow space which is subdivided by partition walls 13" to form channels 13' in-between. These partition walls 13" can be helically wound around the circumference of the respective tube module 12, 12', 12" and about its longitudinal axis "L" so as to guide the heating medium, such as steam, from the inlet pipe 14 around the tube module up to the outlet pipe 15. Alternately, a series of channels can be provided which extend more or less parallel to the longitudinal axis "L". Other arrangements can be used, such as those known from heating or cooling mill rollers or the stators or rotors of agitator mills or the like.

In this way, the dough-like product is kept within the tube 12, 12', 12" at cooking temperature under pressure. This temperature can be, for example, at least 200° F., but can be lower or higher. For example, the temperature can amount to at least 225° F., suitably attaining temperatures between 225 and 250° F. Even higher temperatures up to 300° F. or greater can be used. The temperature and duration of cooling depends largely on the composition and the ingredients of the dough. In general, the higher the temperature, the shorter should be the period of dwell within the tube 12, 12', 12". The cooking time within the tube 12, 12', 12" amounts usually to, for example, at least 5 minutes and can be extended up to about 20 minutes. This influences, of course the necessary length "l" of the tube 12, 12', 12". Therefore, in order to adapt this length easily to the respective recipe, it is convenient to form it from individual modules 12, 12', 12", as shown. Usually, this length "l" can assume at least four-fold (i.e., four times) of the outer diameter "d", but it can extend up to be twenty or thirty times this diameter d, or longer.

Figure 6:
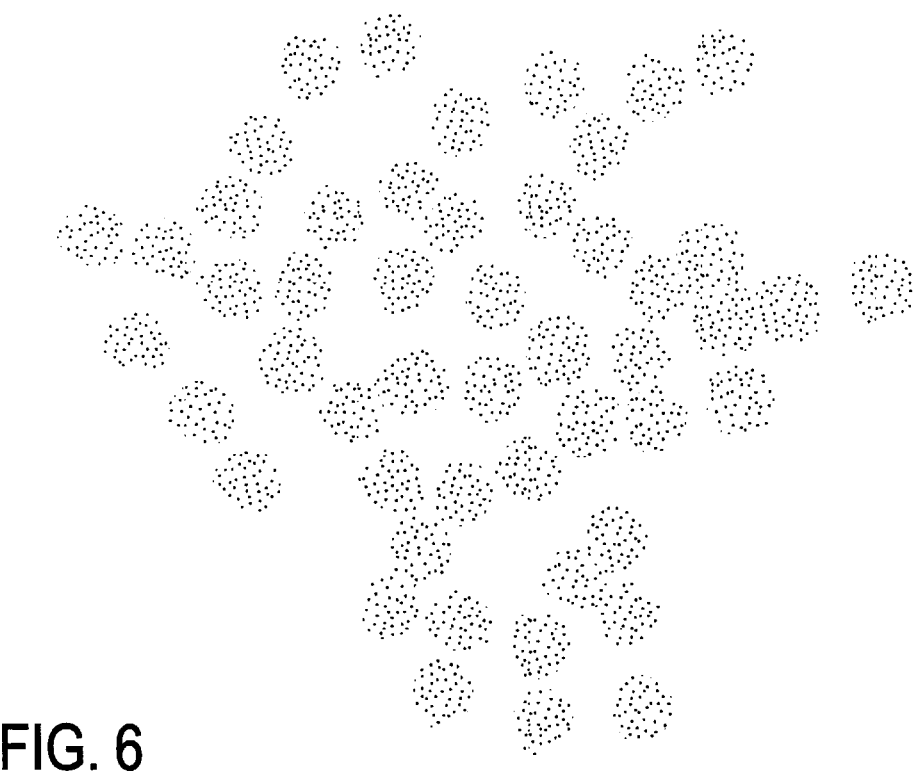
FIG. 6 shows a top view of an exemplary product produced in accordance with the present invention.

The surprising effect of the present invention can best be judged when comparing FIGS. 5 and 6. FIG. 5 shows a product obtained according to the prior art. FIG. 6 illustrates an exemplary product obtained by an exemplary method according to the present invention. At a first glance, it is obvious, that the outer surface of the product shown in FIG. 5 is much smoother, thus, having no perceptible texture or structure. This is due to the complete gelatinization which removes any cellular structure of the initial ingredients. Therefore, when forming snack food from such granules and putting it into milk (or another liquid), it becomes more or less slimy which is distasteful to many customers. This sliminess of the finished product is usually due to the formation of dextrins which are small fragments of starch molecules formed during milling of flour or, as especially in this case, by extrusion where there is a very high shear rate which leads to a degradation and to shattering of the particles.

In contrast, FIG. 6 shows the clear texture of a product which has its cellular structure substantially maintained. This is due to the plug flow characteristics within the tube 12, 12', 12", where no additional mechanical treatment takes place and a uniform heating treatment is ensured.

At a second glance, it also visible in FIG. 5 that the fully gelatinized granules tend widely to adhere to each other. For example, a lump of four adhering granules may be seen at 23, while at 24 there are three granules which stick together. Intersticking pairs of granules can be seen at 25. There are even more sticking together at 26.

This is not so, or at least to a smaller extent, with the granules of FIG. 6 which, due to their structured surfaces, do not tend to sticking. This sticking phenomenon, however, is important for further processing the granules into the desired snack product, because metering of non-sticking granules is, of course, facilitated. In contrast, when breaking off the lumps 23 to 25 of FIG. 5, it is unavoidable that fine fragments are produced in an undesirable manner which still increase the slimy feeling in a liquid. Less stickiness is a characteristic of the process of the present invention, i.e. of a low sheared product with minimum dextrination during extrusion. Nevertheless, dextrins can be formed at the die 19 at the end of the tube 12" where the length is very large and the product is extruded at a very high speed through the hole 19.

While the present invention has been described with reference to a twin-screw extruder 1, even more than two such rotors, e.g. planetary extruders, can be used, although it will normally not be necessary. Likewise, a single screw extruder can be used in some instances.

It will be appreciated by those skilled in the art that the present invention can be embodied in other specific forms without departing from the spirit or essential characteristics thereof. The presently disclosed embodiments are therefore considered, in all respects, to be illustrative and non-restricted. The scope of the invention is indicated by the appended claims rather than the foregoing description, and all changes that come within the meaning and range and equivalence thereof are intended to be embraced therein.

What is claimed is:

1. A method for producing a dough product from starch containing ingredients of cellular structure to obtain a product containing at least 50 percent starch material, the method comprising:

extruding said ingredients by passing them through an extruder having a predetermined inner barrel diameter for receiving an extruder rotor of a predetermined outer diameter, thereby mixing, kneading and heating said ingredients to form a substantially homogeneous mass;

discharging and distributing said mass from said extruder under a predetermined pressure into a straight heated tube of an inner cross-section larger than said outer diameter, thus establishing a plug flow of said mass through said heated tube to cook said mass at a predetermined temperature and for a predetermined period; and forming said mass at the end of said tube into a desired shape, while maintaining its cellular structure at least in part.

2. The method as claimed in claim 1, wherein said predetermined pressure is at least 500 psi.

3. The method as claimed in claim 1, wherein said predetermined pressure is at least 750 psi.

4. The method as claimed in claim 1, wherein said predetermined pressure is at least 1000 psi.

5. The method as claimed in claim 1, wherein said predetermined pressure is 2000 psi in maximum.

6. The method as claimed in claim 1, wherein said step of discharging is effected by a substantially continuous, non-pumping motion of said mass.

7. The method as claimed in claim 6, wherein said step of discharging is effected by an extruder comprising more than one screw.

8. The method as claimed in claim 1, wherein said predetermined temperature is at least 225° F.

9. The method as claimed in claim 1, wherein said predetermined temperature is between 225 and 250° F.

10. The method as claimed in claim 1, wherein said predetermined period is at least 5 minutes.

11. The method as claimed in claim 1, wherein said predetermined period is in the range of 5 to 20 minutes.

12. An apparatus for producing a dough product from starch containing ingredients of a cellular structure to obtain a product containing at least 50 percent starch material, the apparatus comprising:

an extruder including at least one extruder rotor, drive means for imparting rotational energy to said rotor, and elongated barrel means having at least one compartment of a predetermined inner diameter for receiving said rotor of a predetermined outer diameter, said barrel means having a charging opening at one end and a discharging opening at an opposite end;

tube means having a first end and a second end, said first end being connected to said discharging opening and extending along a longitudinal axis, said tube means defining an outer circumference and having an inner cross-section which is defined by an inner circumference and is larger than said outer diameter;

distributing means located in a region of said discharging opening and said first end for distributing product discharged by said extruder over the cross-section of said tube means;

heating means cooperating with said tube means; and shaping means mounted to said second end and having at least one shaping opening of a predetermined cross-section for shaping said product.

13. The apparatus as claimed in claim 12, wherein said distributing means further comprise:

web means arranged substantially perpendicularly to said longitudinal axis and comprising a plurality of through holes.

14. The apparatus as claimed in claim 13, further comprising:

guide means extending in a direction of said longitudinal axis and away from said shaping means for guiding said dough product conveyed by said rotor towards at least part of said through holes.

15. The apparatus as claimed in claim 14, wherein said guide means further comprise:

at least one inclined surface forming an angle of at least 45° with said longitudinal axis.

16. The apparatus as claimed in claim 14, wherein said guide means further comprise:

at least one inclined surface forming an angle of at least 60° with said longitudinal axis.

17. The apparatus as claimed in claim 14, wherein said guide means further comprise:

at least one inclined surface forming an angle of about 65° with said longitudinal axis.

18. The apparatus as claimed in claim 13, wherein said through holes are at a distance from said inner circumference.

19. The apparatus as claimed in claim 12, wherein said extruder includes at least two extruder rotors and said barrel means comprise a compartment for each of said rotors.

20. The apparatus as claimed in claim 19, wherein said extruder rotors comprise intermeshing screw means.

21. The apparatus as claimed in claim 19, wherein said drive means impart a counter-rotating movement to said at least two extruder rotors.

22. The apparatus as claimed in claim 12, wherein said tube means has a length corresponding to at least a four-fold of said outer diameter.

23. The apparatus as claimed in claim 12, wherein said tube means has a length corresponding to thirty times said outer diameter in maximum.

24. The apparatus as claimed in claim 12, wherein said tube means has a length corresponding to twenty times said outer diameter.

25. The apparatus as claimed in claim 12, wherein an inner diameter of said tube means is at least twice said outer diameter of said rotor.

26. The apparatus as claimed in claim 12, wherein an inner diameter of said tube means is at least a four-fold of said outer diameter of said rotor.

27. The apparatus as claimed in claim 12, wherein an inner diameter of said tube means is about twenty times said outer diameter of said rotor.

28. The apparatus as claimed in claim 12, wherein said predetermined cross-section of said shaping means further comprises:

at least one opening smaller than an inner cross-section of said tube means.

* * * * *